April 14, 1964
W. W. WARREN
3,129,372
ELECTRICAL ENERGY ALLOCATOR
Filed Aug. 7, 1961
2 Sheets-Sheet 1
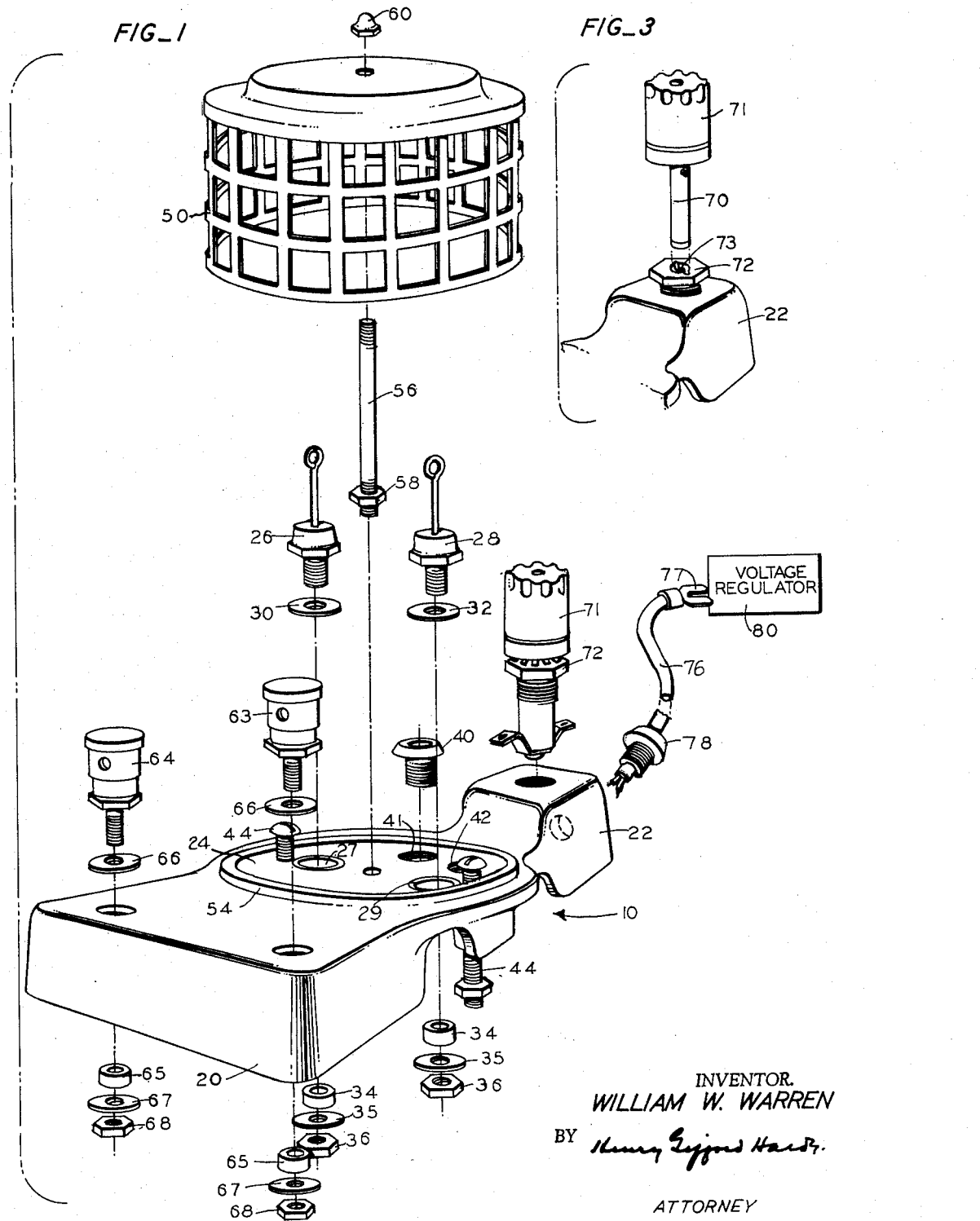
INVENTOR.
WILLIAM W. WARREN
BY *Henry Gifford Hardy*
ATTORNEY

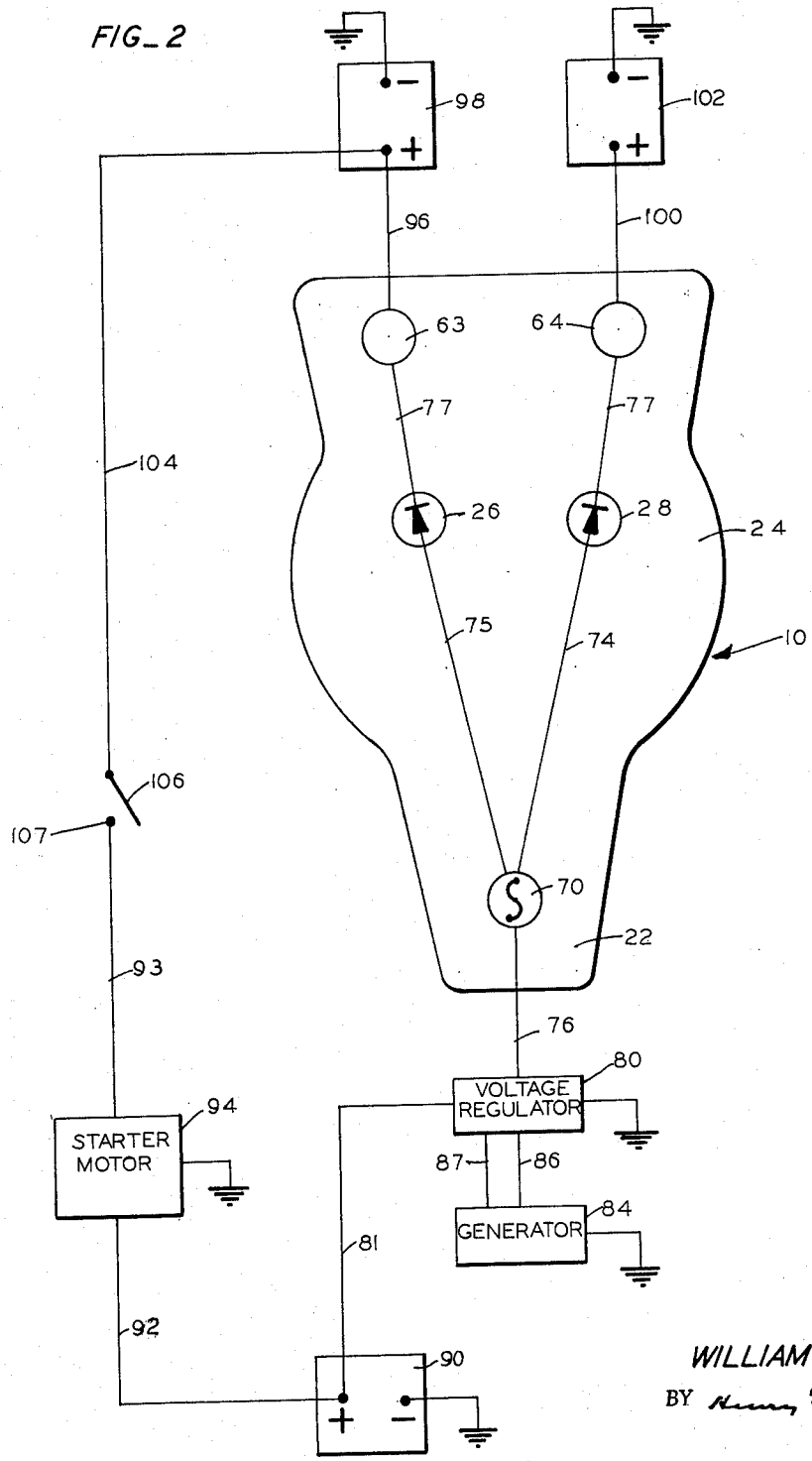

United States Patent Office 3,129,372
Patented Apr. 14, 1964

3,129,372
ELECTRICAL ENERGY ALLOCATOR
William W. Warren, Bell Spring P.O.,
Blue Rock Ranch, Calif.
Filed Aug. 7, 1961, Ser. No. 129,734
2 Claims. (Cl. 320—15)

This invention relates generally to an electrical apparatus, and more specifically to an apparatus for irreversibly allocating electrical energy from a single generating source to one or more auxiliary circuits in an electrical system.

The device of the present invention has primary application in an automotive electrical system where one or more auxiliary circuits are employed for providing electrical energy for accessories, towed vehicles, such as trailers or boats, or the like, and which may also be used when necessary to assist the main car battery in starting the engine.

Auxiliary circuits have been used in automotive electrical systems in the past, but generally have proven to be unsatisfactory under operating conditions due to the fact that it was not possible to completely electrically isolate each circuit in the system from one another to thereby prevent current drainage from one battery in one circuit charged at a higher potential to another battery in another circuit charged at a lower potential.

It is therefore an object of the present invention to provide a device for allocating electrical energy from a common generating source to one or more auxiliary circuits in an electrical system.

It is another object of the present invention to provide a device for irreversibly allocating electrical energy from a common generating source to one or more auxiliary circuits in an electrical system with no possible feed-back from one circuit to another.

Yet another object of the present invention is to provide a device for apportioning electrical energy from a generator to a plurality of electrical storage batteries according to the difference in potential of each battery.

A further object of the present invention is to provide an electrical energy allocating device having no moving parts for completely electrically isolating a plurality of circuits from one another in an electrical system.

A still further object of the present invention is to provide an auxiliary electrical circuit comprising one or more auxiliary batteries adapted to be connected to a main electrical circuit, wherein the auxiliary batteries are completely electrically isolated from each other and from the main circuit.

Still another object of the present invention is to provide an electrical system comprising a main circuit and a plurality of auxiliary circuits all connected in parallel, including a common source of current flow connected to all the circuits, and means connectable between the source and each auxiliary circuit for completely electrically isolating each auxiliary circuit from each other and from the main circuit.

The apparatus of the present invention is an electronic device which is connected from the car generator and the voltage regulator to one or more auxiliary batteries for proportionally allocating electrical energy to each of the auxiliary batteries according to the amount of electrical energy each battery requires to bring it up to full charge potential. The main battery and each of the auxiliary batteries are all completely electrically isolated from each other with no possible feed-back from one to the other. This is accomplished by means of a frame member containing a diode rectifier for each auxiliary battery in the circuit. Electrical energy flows from the generator through the voltage regulator to an encapsulated fuse mounted in the frame member to prevent damage to the device due to short circuiting. At this point the circuit splits to each diode rectifier and thence to each auxiliary battery. In this manner, current can flow only from the generator to each battery due to the unidirectional circuit flow characteristics of the diode rectifiers.

This arrangement eliminates the possibility of an undercharged auxiliary battery parasiting electrical energy from the main car battery or from other auxiliary batteries in the circuit which are charged at a higher potential. The auxiliary circuit may be easily installed in a standard automotive electrical circuit without requiring any modification whatever in the circuit, and may be connected so as to function in cooperation with the existing circuit or completely independently thereof.

While the allocator of the present invention will be hereinafter described and illustrated in connection with an automotive electrical circuit, it will be understood that it may be employed in any electrical system utilizing auxiliary circuits for any purpose. For example, it may be used in a refrigerated truck or railroad car for providing an emergency power starting circuit to prevent frozen foods from being spoiled in the event the main power supply fails. The allocator has great utility in conjunction with aircraft or marine electrical systems for the purpose of powering accessories and providing a safe and sure starting circuit.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details or construction without departing from the spirit thereof or the scope of the appended claims.

In the drawings:

FIGURE 1 is an exploded perspective view of the device of the present invention;

FIGURE 2 is a schematic diagram illustrating an exemplary automative electrical circuit utilizing the device of the present invention FIGURE 3 is a partial perspective view of the means for disconnecting the allocator from the main automotive circuit.

In FIGURE 1, there is shown an exploded view of the device of the present invention, indicated generally at 10, and comprising a pair of diode rectifiers 26 and 28 mounted in a frame 20 and connected in series between the voltage regulator 80 and a pair of batteries. A frame 20 which is cast from metal, such as aluminum, has a raised rear portion 22 and a relatively large center portion 24. A pair of diode rectifiers 26 and 28 are threadedly mounted in apertures 27 and 29, respectively, in central portion 24, and are secured thereto by means of insulating bushings 34, mica washers 35, and nuts 36.

Diode rectifiers 26 and 28 may be of any commercially available type, but are preferably of the silicon type which are conservatively rated to ensure long-term reliability with low forward voltage drop for providing high rectification, efficiency, good regulation, and very low internal losses. For example, in a standard automotive electrical circuit wherein the generated voltage is approximately 12.0 volts, the use of a silicon-type rectifier having a rating of 50 volts and 25 amperes at 150 degrees centigrade case temperature having a maximum full load voltage drop of .55 volt is preferred. In order to aid in dissipating the heat generated by current passing through the diode rectifiers, the central portion 24 is cast so as to contain a relatively large mass of metal in order to function as a heat sink. Further heat dissipation is provided by cooled air from the fan of the automobile.

A pair of wire entry bushings 40 are threadedly engaged in apertures 41 and 42 in central portion 24 to thereby provide an insulated passage for the wires coming up through the bottom of the base 20 for connection to the rectifiers 26 and 28. Also mounted in central portion 24 through suitable apertures therein are a pair of bolts 44 for fastening the base 20 to the chassis of the automobile.

Portion 24 has an integral seating ring 54 for mounting thereon a cage-like housing 50 which is secured to ring 54 by means of a center hold-down stud 56 which extends through a suitable aperture in portion 24 and is secured thereto by a nut 58. Stud 56 extends upwardly through an aperture in the top of housing 50 for threaded engagement with a locking nut 60. Housing 50 functions to prevent metallic objects from accidentally contacting rectifiers 26 and 28 and thereby causing a short circuit, and to promote heat dissipation by allowing the fan draft to cool the rectifiers, as above described.

A pair of binder posts 63 and 64 are mounted on the top of base 20 adjacent the front end thereof and are insulated therefrom by mica washers 66. Binder posts 63 and 64 are secured to base 20 by means of insulating bushings 65, fiber washers 67 and nuts 68, and have suitable apertures in the upper portions thereof for securing thereto the wires from the auxiliary batteries. Mounted on the top face of rear deck portion 22 is an encapsulated fuse 70 which is designed to prevent damage from short circuits in the system and is secured to portion 22 by means of a binder nut 72. As best seen in FIGURE 3, the fuse 70 is removably attached at one end thereof to a knob 71 and is inserted into and removed from a bayonet-type socket 73 in binder nut 72 by a simple turning movement. It will be evident that when the fuse 70 is removed from the socket 73, the circuit from the generator to the diode rectifiers is broken. A feed wire 76 is provided for connecting the distributor to the voltage regulator 80, and has one end thereof mounted in the rear face of portion 22 by means of an inner bushing 78 for connection to fuse 70, and a forked lug 77 on the other end thereof for connection to a suitable terminal of the voltage regulator 80.

Referring now to FIGURE 2, there is shown schematically an automotive electrical system employing the allocator of the present invention.

The main automotive circuit is shown as comprising the voltage regulator 80 connected to the generator 84 by wire 86 and the electrical armature control wire 87, and to the main battery 90 by wire 81. Battery 90 is connected to the starter motor 94, as in a conventional single line circuit, by wire 92 for starting the engine of the car.

The allocator 10 is conneced to a suitable terminal of the voltage regulator 80 by wire 76 which connects with fuse 70 mounted on rear portion 22 of frame 20. The circuit then splits to connect the diode rectifier 26 to fuse 70 by wire 75, and to connect the diode rectifier 28 to fuse 70 by wire 74. Diode rectifiers 26 and 28 are connected to binder posts 63 and 64, respectively, by metallic bars 77. Wire 96 connects the positive terminal of the battery 98 to binder post 63 and rectifier 26, and wire 100 connects the positive terminal battery 102 to binder post 64. The batteries 98 and 102 may be connected to an automotive accessory, such as the radio, headlights, etc., or may be used in a towed vehicle, such as a trailer or boat. In addition, the battery 98 may be connected to the starter motor 94 to assist main battery 90 in starting the engine. Such a connection is shown schematically in FIGURE 2 by a wire 104 from the positive terminal of battery 98 terminating in a suitable switch 106 which may be conveniently mounted on the dashboard of the automobile. A wire 93 from starter motor 94 terminates in contact 107, so that when switch 106 is closed to engage contact 107, electrical current will flow from battery 98 to starter motor 94.

Thus it is seen that two auxiliary circuits connected in parallel to each other and to the main circuit are provided in the electrical system illustrated in FIGURE 2. One auxiliary circuit includes the generator 84, voltage regulator 80, fuse 70, diode rectifier 26, battery 98, and the load to which battery 98 is connected. The other auxiliary circuit includes generator 84, voltage regulator 80, fuse 70, diode rectifier 28, battery 102, and the load to which battery 102 is connected. This arrangement eliminates the problem of feedback which is normally encountered in electrical systems having a number of batteries connected in parallel, since each battery is completely electrically isolated from the others by the diode rectifiers 26 and 28, which will allow electrical energy to flow only from the generator 84 to batteries 98 and 102, and which will prevent a reverse flow of current through the system.

The generator 84 will provide electrical energy to the batteries in the circuit in accordance with the amount of energy needed to bring each battery up to its full charge potential. Inasmuch as the main car battery 90 will expend a great proportion of its energy starting the engine of the car, the circuit is arranged to allow battery 90 to draw the energy it needs from the generator 84 to bring it up to its full charge potential. The remaining portion of the energy output of generator 84 will be apportioned between auxiliary batteries 98 and 102 according to the amount of energy each battery needs to bring it up to full charge potential. Thus it is seen that the far greater proportion of the energy output of generator 84 will go to the main car battery 90 than to the auxiliary batteries 98 and 102.

The conventional automotive generator is rated at 12.0 volts, but actually is set to generate 13.5 to 14.0 volts in order to compensate for wire transmission losses, etc., and so will not be overloaded in keeping all the batteries in the system at full charge potential. In normal use, the generator is required to operate only for a relatively short time in order to bring the battery up to full charge potential, and then is cut back by the voltage regulator to merely idle to prevent it from consuming valuable horsepower unnecessarily. In the illustrated circuit, the generator 84 will be required to operate at capacity a sufficient amount of time to bring all the batteries in the system up to full charge potential, thereby ensuring that all the batteries in the system are fully recharged after each use without necessitating a separate recharging operation.

It will be observed that the two auxiliary circuits may be easily and quickly completely disconnected from the main circuit merely by turning the knob 71 which carried the fuse 70 and lifting this assembly out of the circuit, as shown in FIGURE 3. It will also be apparent that the two auxiliary circuits will be completely disconnected if the fuse 70 is blown as a result of being overloaded. In addition, if it is desired to remove the auxiliary circuits from the automobile, all that is required is that the forked lug 77 be disconnected from the voltage regulator terminal, and the allocator and batteries be released from their respective mountings.

What is claimed is:

1. Means for distributing charging currents from an electrical generator to a plurality of storage batteries comprising, a frame having a massive central portion thereon to serve as a heat sink, a plurality of electrically isolated rectifiers mounted on the central portion of said frame in heat-conducting relationship thereto, a vented cage-like enclosure secured to the central portion of said frame to enclose and protect said rectifiers and to dissipate heat therefrom, an input terminal on said frame for connection to a source of electrical charging currents, a plurality of output terminals on said frame for connection to respectively separate storage batteries, and a plurality of electrical distribution circuits, each connected between said input terminal and a respective one of said rectifiers poled in a direction to permit only unidirectional charging currents to flow in each of said distribution circuits, whereby reverse flow of discharge currents from any one of the said storage batteries into any other of said storage batteries is prevented.

2. Means for distributing charging currents from an electrical generator to a plurality of storage batteries comprising, a frame having a massive central portion thereon to serve as a heat sink, a plurality of electrically isolated rectifiers mounted on the central portion of said frame in heat-conducting relationship thereto, an input terminal on said frame for connection to a source of electrical charging currents, a plurality of output terminals on said frame for connection to respectively separate storage batteries, and a plurality of electrical distribution circuits, each connected between said input terminal and a respective one of said output terminals and each including a respective one of said rectifiers poled in a direction to permit only unidirectional charging currents to flow in each of said distribution circuits, whereby reverse flow of discharge currents from any one of the said storage batteries into any other of said storage batteries is prevented.

References Cited in the file of this patent
UNITED STATES PATENTS
3,021,469    Ganiere et al. _____ Feb. 13, 1962